United States Patent
Xue et al.

(10) Patent No.: US 11,314,910 B1
(45) Date of Patent: Apr. 26, 2022

(54) DISCRETE ELEMENT METHOD-BASED SIMULATION METHOD AND SYSTEM FOR ACOUSTIC EMISSION

(71) Applicant: Institute Of Geology and Geophysics, Chinese Academy Of Sciences, Beijing (CN)

(72) Inventors: Lei Xue, Beijing (CN); Fengchang Bu, Beijing (CN); Mengyang Zhai, Beijing (CN); Xiaolin Huang, Beijing (CN); Chao Xu, Beijing (CN); Haoyu Wang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/385,361

(22) Filed: Jul. 26, 2021

(30) Foreign Application Priority Data

Dec. 21, 2020 (CN) .......................... 202011518985.9

(51) Int. Cl.
*G06F 30/25* (2020.01)
*G06F 111/10* (2020.01)

(52) U.S. Cl.
CPC .......... *G06F 30/25* (2020.01); *G06F 2111/10* (2020.01)

(58) Field of Classification Search
CPC .............................. G06F 30/25; G06F 2111/10
USPC ........................................................... 703/2
See application file for complete search history.

(56) References Cited

U.S. PATENT DOCUMENTS

| | | | |
|---|---|---|---|
| 2011/0015907 A1* | 1/2011 | Crawford | G01V 99/00 703/2 |
| 2011/0239767 A1* | 10/2011 | Bellin | G01N 3/44 73/587 |
| 2011/0286304 A1* | 11/2011 | Thigpen | G01N 29/14 367/25 |
| 2013/0090902 A1* | 4/2013 | Yao | G06F 30/20 703/2 |
| 2013/0345994 A1* | 12/2013 | Wiklund | G01F 1/66 702/46 |
| 2017/0275970 A1* | 9/2017 | Crawford | G01V 99/005 |

(Continued)

FOREIGN PATENT DOCUMENTS

CN 111272883 A 6/2020

OTHER PUBLICATIONS

Lisjak et al. (Numerical simulation of acoustic emission in brittle rocks by two-dimensional finite-discrete element analysis, Geophys. J. Int. (2013) 195, 423-443) (Year: 2013).*

Robert A. Caulk (Modeling acoustic emissions in heterogeneous rocks during tensile fracture with the Discrete Element Method, Open Geomechanics, 2020, pp. 1-19) (Year: 2020).*

(Continued)

*Primary Examiner* — Iftekhar A Khan
(74) *Attorney, Agent, or Firm* — Nields, Lemack & Frame, LLC

(57) ABSTRACT

The present disclosure relates to a discrete element method (DEM)-based simulation method and system for acoustic emission (AE). The simulation method includes: arranging a monitoring point on a surface of a numerical model; monitoring a velocity waveform of the monitoring point; and analyzing the velocity waveform to obtain a hit, energy, and a b-value of AE. The method in the present disclosure can resolve problems of principle incompliance, poor authentic- (Continued)

ity, and high occupation of calculation resources in a traditional simulation method for AE.

2 Claims, 10 Drawing Sheets

(56) References Cited

U.S. PATENT DOCUMENTS

2017/0277812 A1* 9/2017 Holland ............... E21B 49/02
2019/0057168 A1* 2/2019 Holland ............... E21B 49/003

OTHER PUBLICATIONS

Ji et al. (Discrete element modeling of acoustic emission in rock fracture, Theoretical and Applied Mechanics Letters, 2013, pp. 1-6) (Year: 2013).*

Liu et al. (Numerical Study of Rock Fragmentation Process and Acoustic Emission by FDEM Based on Heterogeneous Model, Hindawi Mathematical Problems in Engineering, 2020, pp. 1-13) (Year: 2020).*

Chinese communication, with English translation, dated Apr. 16, 2021 in corresponding Chinese patent application No. 202011518985.9.

Chinese communication, with English translation, dated Jun. 4, 2021 in corresponding Chinese patent application No. 202011518985.9.

Chinese communication, with English translation, dated Jul. 19, 2021 in corresponding Chinese patent application No. 202011518985.9.

R. Ulusay, International Society for Rock Mechanics Commission on Testing Methods, "The ISRM Suggested Methods for Rock Characterization, Testing and Monitoring: 2007-2014", Springer International Publishing, 2015.

Hazzard et al., "Simulating Acoustic Emissions in Bonded-Particle Models of Rock", International Journal of Rock Mechanics and Mining Sciences, vol. 37, pp. 867-872, 2000.

Hazzard et al., "Moment Tensors and Micromechanical Models", Tectonophysics, vol. 356, pp. 181-197, 2002.

Wang et al., "Analysis of Wave Velocity Characteristics of Critical Rock Brittle Failure", Rock and Soil Mechanics, vol. 35, No. 2, Feb. 2014.

* cited by examiner

DISCRETE ELEMENT METHOD-BASED SIMULATION METHOD AND SYSTEM FOR ACOUSTIC EMISSION

TECHNICAL FIELD

The present disclosure relates to the field of simulation of acoustic emission (AE), and in particular, to a discrete element method (DEM)-based simulation method and system for AE.

BACKGROUND

Understanding the fracture process of rocks is of great significance for many engineering practices. However, one can rarely see this process intuitively. Researchers usually rely on other means, of which AE technique is very common as it can realize continuous monitoring without disturbing the loading system. A laboratory AE test can produce reliable AE results, but is usually subject to many limitations. For example, the International Society for Rock Mechanics (ISRM) has made strict stipulations concerning parallelism and smoothness of end surfaces of rock samples. Field sampling makes it difficult to ensure integrity of the rock samples, and there are many uncertainties in transportation of the rock samples from the field to a laboratory. As a result, lots of manpower, material, and financial resources are required to ensure the integrity of the rock samples. In addition, the experiment requires a low-noise environment. In the experiment process, it is also difficult to control a single factor, reducing comparability of experimental results.

Numerical simulation can overcome technical disadvantages of the experiment, and becomes a powerful means to study the rock fracture process. A discrete element method (DEM) has obvious advantages in simulating macroscopic fracture and damage evolution of rocks, and is one of mainstream methods for simulating rock fracture. In DEM, a rock material is represented as an assembly of discrete elements that are connected by bonds. A fracture process of a stressed rock is implemented through motion of discrete elements and interaction between them. When the external force exceeds strength of a bond, the bond will be broken, corresponding actual crack propagation of the rock sample. For simulation of AE, Hazzard and Young first proposed a method based on particle flow code (PFC) of DEM in 2000. In this method, kinetic energy of particles around the bond breaking is monitored and used to directly quantify AE energy radiated from a source. AE characteristics of granites are finally obtained through spatial and temporal cluster analysis on breakage of bonds. In 2002, Hazzard and Young improved the foregoing method by introducing moment tensor at the time of bonds broken, and successfully simulated the AE test in the rock fracture process. This method makes good use of the characteristics of DEM and can simulate AE better, so it has been widely applied up to now. However, many scholars have pointed out that this method has the following problems. 1) The simulation technique does not follow principles of an actual AE test. In actual AE test, normal motion components on the surface of a rock sample is directly monitored by arranging monitoring points on the surface of the rock sample and installing piezoelectric sensors at the monitoring points, and an obtained motion waveform is analyzed to finally get AE parameters. However, the simulation technique is to monitor the change of moment tensor when the bonds are broken. Therefore, the principles of the simulation technique and the actual AE test are different. 2) The simulation technique can only monitor AE generated by new fractures. Other AE signals derived from crack reactivation e.g. friction are ignored. The simulation technique is realized by monitoring the moment tensor change directly. Breakage of one or more neighboring bonds is regarded as one new AE event, and reactivation of cracks is ignored. Therefore, many AE activities cannot be recorded, failing to reflect AE really. 3) Many calculation resources are occupied to calculate the moment tensor change, lowering a simulation velocity and resulting in a low calculation efficiency.

In view of the three problems in the moment tensor method for simulating AE, the present disclosure provides a DEM-based simulation method and system for AE.

SUMMARY

The present disclosure aims to provide a DEM-based simulation method and system for AE, to resolve problems of principle incompliance, poor authenticity, and high occupation of calculation resources in a prior-art simulation technique for AE.

To achieve the above objective, the present disclosure provides the following solutions:

The present disclosure provides a DEM-based simulation method for AE. The simulation method includes:

arranging a monitoring point on a surface of a numerical model;

monitoring a velocity waveform of the monitoring point; and analyzing the velocity waveform to obtain a hit, energy, and a b-value of AE, where the hit of AE is defined as signal data that exceeds a threshold and causes system channel accumulation, and is in direct proportion to crack growth; the energy is defined as the square of a signal waveform, and is in direct proportion to a fracture magnitude; and a calculation formula of energy $E(i)$ of the $i^{th}$ piece of data is as follows:

$$E(i)=V_x^2=(i)+V_y^2(i)$$

In the foregoing formula, $V_x$ represents an x-direction velocity component; $V_y$ represents a y-direction velocity component; and the b-value represents a scale of AE, and is widely used to represent a scale of crack prorogation. The b-value is usually obtained by performing linear fitting according to the following Gutenberg-Richter formula:

$$\text{Log } N=a-b\times M$$

In the foregoing formula, N represents an amount of data whose magnitude is greater than or equal to M; a and b are constants; and M represents the magnitude, and is usually obtained according to the following formula $$M(i) = \frac{2}{3}\log E(i) - 3.2$$

Optionally, the analyzing the velocity waveform to obtain a hit of AE specifically includes:

A1: importing the velocity waveform of the monitoring point;

A2: analyzing each piece of sampled data in sequence;

A3: determining whether the $i^{th}$ piece of data is less than or equal to a total amount of sampled data;

A4: if the $i^{th}$ piece of data is less than or equal to the total amount of sampled data, ending the process; or A5: if the $i^{th}$ piece of data is not less than or equal to the total amount of sampled data, performing a next step;

A6: determining whether the $i^{th}$ piece of data is greater than or equal to a preset threshold;

A7: if the $i^{th}$ piece of data is not greater than or equal to the preset threshold, setting i to i+1, and returning to step A2 to analyze a next piece of data; or A8: if the $i^{th}$ piece of data is greater than or equal to the preset threshold, performing a next step;

A9: determining whether an AE event ends;

A10: if the AE event does not end, forcibly ending the AE event, and performing a next step; or A11: if the AE event ends, recording characteristic parameters of the AE event, including an arrival time, an amplitude, signal duration, and a ringing hit; and A12: analyzing a next AE signal, till all the sampled data is analyzed.

Optionally, the analyzing the velocity waveform to obtain energy specifically includes:

B1: determining whether the $i^{th}$ piece of data is less than or equal to the total amount of sampled data;

B2: if the $i^{th}$ piece of data is not less than or equal to the total amount of sampled data, ending the process; or B3: if the $i^{th}$ piece of data is less than or equal to the total amount of sampled data, calculating $E(i)=[V_x^2(i)+V_y^2(i)]$;

B4: calculating $$M(i) = \frac{2}{3}\log E - 3.2;$$

and

B5: setting i to i+1, and returning to step B1, till all the sampled data is analyzed.

Optionally, the analyzing the velocity waveform to obtain a b-value specifically includes:

C1: inputting a magnitude range $[M_{min}, M_{max}]$, and setting M to $M_{min}$;

C2: determining whether the $i^{th}$ piece of data is less than or equal to the total amount of sampled data;

C3: if the $i^{th}$ piece of data is not less than or equal to the total amount of sampled data, ending the process; or C4: if the $i^{th}$ piece of data is less than or equal to the total amount of sampled data, performing a next step;

C5: obtaining the number N1 of pieces of data whose magnitudes are greater than or equal to $M_{min}$ in M(1)~M(i), obtaining the number N2 of pieces of data whose magnitudes are greater than or equal to $M_{min+0.1}$ in M(1)~M(i), . . . , and obtaining the number Nm of pieces of data whose magnitudes are greater than or equal to $M_{max}$ in M(1)~M(i); and C6: obtaining m groups of $(M_{min}\sim_{max})\sim N_{(1\sim m)}$ data, performing fitting according to a formula log N=a−bM to obtain a value of b(i), setting i to i+1, and returning to step C2.

The present disclosure further provides a DEM-based simulation system for AE. The simulation system includes:

a monitoring point arrangement module, configured to arrange a monitoring point on a surface of a numerical model;

a velocity waveform monitoring module, configured to monitor a velocity waveform of the monitoring point;

a velocity waveform analysis module, configured to analyze the velocity waveform to obtain a hit, energy, and a b-value of AE;

a rock crack growth determining module, configured to determine rock crack growth based on the hit of AE;

a rock fracture magnitude determining module, configured to determine a magnitude of rock fracture based on the energy; and a rock crack propagation scale determining module, configured to determine a scale of rock crack propagation based on the b-value.

Optionally, the velocity waveform analysis module includes an acoustic-emission hit analysis unit, an energy analysis unit, and a b-value analysis unit.

Optionally, the acoustic-emission hit analysis unit is specifically configured to perform the following steps:

A1: importing the velocity waveform of the monitoring point;

A2: analyzing each piece of sampled data in sequence;

A3: determining whether the $i^{th}$ piece of data is less than or equal to a total amount of sampled data;

A4: if the $i^{th}$ piece of data is less than or equal to the total amount of sampled data, ending the process: or A5: if the $i^{th}$ piece of data is not less than or equal to the total amount of sampled data, performing a next step:

A6: determining whether the $i^{th}$ piece of data is greater than or equal to a preset threshold;

A7: if the $i^{th}$ piece of data is not greater than or equal to the preset threshold, setting i to i+1, and returning to step A2 to analyze a next piece of data: or A8: if the $i^{th}$ piece of data is greater than or equal to the preset threshold, performing a next step;

A9: determining whether an AE event ends;

A10: if the AE event does not end, forcibly ending the AE event, and performing a next step: or A11: if the AE event ends, recording characteristic parameters of AE, including an arrival time, an amplitude, signal duration, and a ringing hit; and A12: analyzing a next AE signal, till all the sampled data is analyzed.

Optionally, the energy analysis unit is specifically configured to perform the following steps:

B1: determining whether the $i^{th}$ piece of data is less than or equal to the total amount of sampled data;

B2: if the $i^{th}$ piece of data is not less than or equal to the total amount of sampled data, ending the process; or B3: if the $i^{th}$ piece of data is less than or equal to the total sampled data, calculating $E(i)=[V_x^2(i)+V_y^2(i)]$, where E(i) represents energy of the $i^{th}$ piece of data, $V_x$ represents an x-direction velocity component, and $V_y$ represents a y-direction velocity component;

B4: calculating $$M(i) = \frac{2}{3}\log E(i) - 3.2,$$

where M(i) represents a magnitude of the $i^{th}$ piece of data; and

B5: setting i to i+1, and returning to step B1, till all the sampled data is analyzed.

Optionally, the b-value analysis unit is specifically configured to perform the following steps:

C1: inputting a magnitude range $[M_{min}, M_{max}]$, and setting M to $M_{min}$;

C2: determining whether the $i^{th}$ piece of data is less than or equal to the total amount of sampled data:

C3: if the $i^{th}$ piece of data is not less than or equal to the total amount of sampled data, ending the process; or C4: if the $i^{th}$ piece of data is less than or equal to the total amount of sampled data, performing a next step;

C5: obtaining the number N1 of pieces of data whose magnitudes are greater than or equal to $M_{min}$ in M(1)~M(i), obtaining the number N2 of pieces of data whose magnitudes are greater than or equal to $M_{min+0.1}$ in M(1)~M(i), ..., and obtaining the number Nm of pieces of data whose magnitudes are greater than or equal to $M_{max}$ in M(1)~M(i); and C6: obtaining m groups of $(M_{min}{\sim}_{max})$~$N_{(1{\sim}m)}$ data, performing fitting according to a formula log N=a−bM to obtain a value of b(i), setting i to i+1, and returning to step C2.

According to specific embodiments provided in the present disclosure, the present disclosure has the following technical effects:

1. Compliance with principles of an actual AE test. Though traditional moment tensor method can simulate AE by tracking change of moment tensor, it is quite different from the principles of the actual AE test. In the actual AE test, normal motion components on the surface of a rock sample is directly monitored by arranging monitoring points on the surface of the rock sample and installing piezoelectric sensors at the monitoring points, and an obtained motion waveform is analyzed to further get AE parameters. In the method of the present disclosure, the monitoring points are arranged on the surface of the numerical model, the x-direction velocity component is directly monitored in the simulation process to obtain the velocity waveforms, and the units for calculating the AE parameters are provided based on these velocity waveforms. Therefore, the method of the present disclosure resolves a problem in simulation performed according to the principles of the actual AE test.

2. Higher authenticity. In addition to compliance with the principles of the actual AE test, the method of the present disclosure has higher authenticity compared with the traditional moment tensor method. The example shows that the energy, the hit, and the b-value of simulated AE obtained by using the method of the present disclosure approximate those obtained by using the traditional moment tensor method, and more approximate those obtained in the actual AE test.

3. Higher calculation speed. In the traditional moment tensor method, the change of force and displacement of bonds need to be calculated in each step to construct a matrix for operations. In the method of the present disclosure, only the velocity components of the monitoring points need to be monitored. Under the same condition, the method of the present disclosure achieves a calculation speed 4.9 times higher than that in the traditional moment tensor method, greatly reducing an operation time and memory usage.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
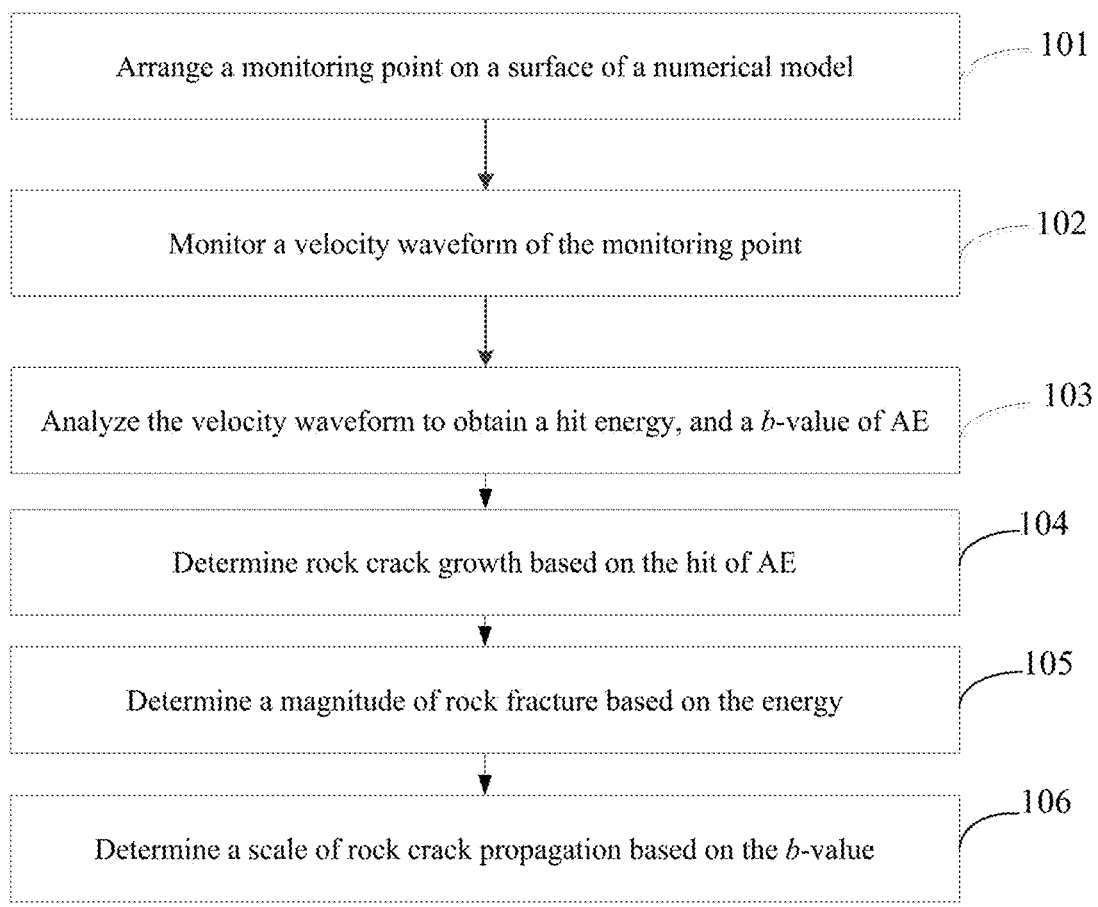
FIG. 1 is a flowchart of a DEM-based simulation method for AE according to an embodiment of the present disclosure.

The technical solutions of the embodiments of the present disclosure are clearly and completely described below with reference to the accompanying drawings in the embodiments of the present disclosure. Apparently, the described embodiments are only a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a DEM-based simulation method and system for AE, to resolve problems of principle incompliance, poor authenticity, and high occupation of calculation resources in a prior-art simulation technology for AE.

The method and the system described in the present disclosure are applicable to a discrete element method (including multiple pieces of software such as particle flow code (PFC), universal distinct element code (UDEC), and 3-dimensional distinct element code (3DEC)). The PFC software is used as an example for description.

To make the objective, features, and advantages of the present disclosure more obvious and comprehensive, the following further describes in detail the present disclosure with reference to the accompanying drawing and specific implementations.

According to principles of an actual AE experiment, the method of the present disclosure includes: directly arranging a monitoring point on a surface of a numerical model in the PFC, monitoring an x-direction velocity waveform of the monitoring point, and analyzing the velocity waveform to obtain information of AE in a model fracture process. The preset disclosure adopts the following specific technical solutions:

1. Uniaxial compression strength, a Young modulus, and other parameters of a rock sample are obtained based on a result of an indoor physical model experiment.

2. The physical model experiment is reproduced by using the PFC, to obtain a satisfactory simulation effect. When the rock sample is simulated, mechanical parameters of bonding between mineral particles of the rock sample cannot be obtained. Therefore, microscopic parameters in the PFC can be determined only by using a trial-and-error method. That is, the microscopic parameters are continuously adjusted till simulated macroscopic mechanical attributes are consistent with actual macroscopic mechanical attributes of the rock sample.

3. The monitoring point is arranged on the surface of the numerical model in the PFC. In the actual AE experiment, a position of an AE probe is a waveform sampling point of AE, namely, the monitoring point. To maximally approximate the actual AE experiment, a position of the monitoring point in the PFC may be consistent with the position of the AE probe in the actual AE experiment, in other words, both the position of the monitoring point and the position of the AE probe are located in the middle of the numerical model.

4. The velocity waveform of the monitoring point is obtained. In the actual AE experiment, a motion waveform of the sampling point is monitored by using the AE probe. In the PFC, a motion waveform of the preset monitoring point can be directly monitored by executing a "ball history velocity" command in an inside language Fish.

5. The velocity waveform is analyzed to obtain AE parameters such as a hit, energy, and a b-value. Specific steps are as follows:

FIG. 1 is a flowchart of a DEM-based simulation method for AE according to an embodiment of the present disclosure. As shown in FIG. 1, the method includes the following steps:

Step 101: Arrange a monitoring point on a surface of a numerical model.

Step 102: Monitor a velocity waveform of the monitoring point.

Step 103: Analyze the velocity waveform to obtain a hit, energy, and a b-value of AE.

Step 104: Determine rock crack growth based on the hit of AE.

Step 105: Determine a magnitude of rock fracture based on the energy.

Step 106: Determine a scale of rock crack propagation based on the b-value.

Specifically, step 103 includes the following steps:

1) Obtain the hit of AE. In a PFC-based simulation process, a system obtains a piece of data every ten steps by default, in other words, a sampling time of the obtained velocity waveform is ten steps. Before analysis, a threshold, an end time, and maximum AE duration need to be preset. The velocity waveform of the monitoring point is imported, and each piece of sampled data is analyzed in sequence. When the $i^{th}$ piece of data is greater than or equal to the preset threshold, an AE event starts. If the $i^{th}$ piece of data is less than the preset threshold, a next piece of data is analyzed. Next, it is determined whether the AE event ends, in other words, it is determined whether sampled data is continuously lower than the threshold within the maximum duration and whether the end time is reached. If the AE event does not end, it is considered that the AE signal is continuous. In this case, the signal will be forcibly truncated when the maximum duration is reached, and the AE event ends. In this case, characteristic parameters of the AE event are recorded, including an arrival time, an amplitude, duration, and a ringing hit, and a next AE signal is analyzed, till all sampled data is analyzed.

Figure 2:
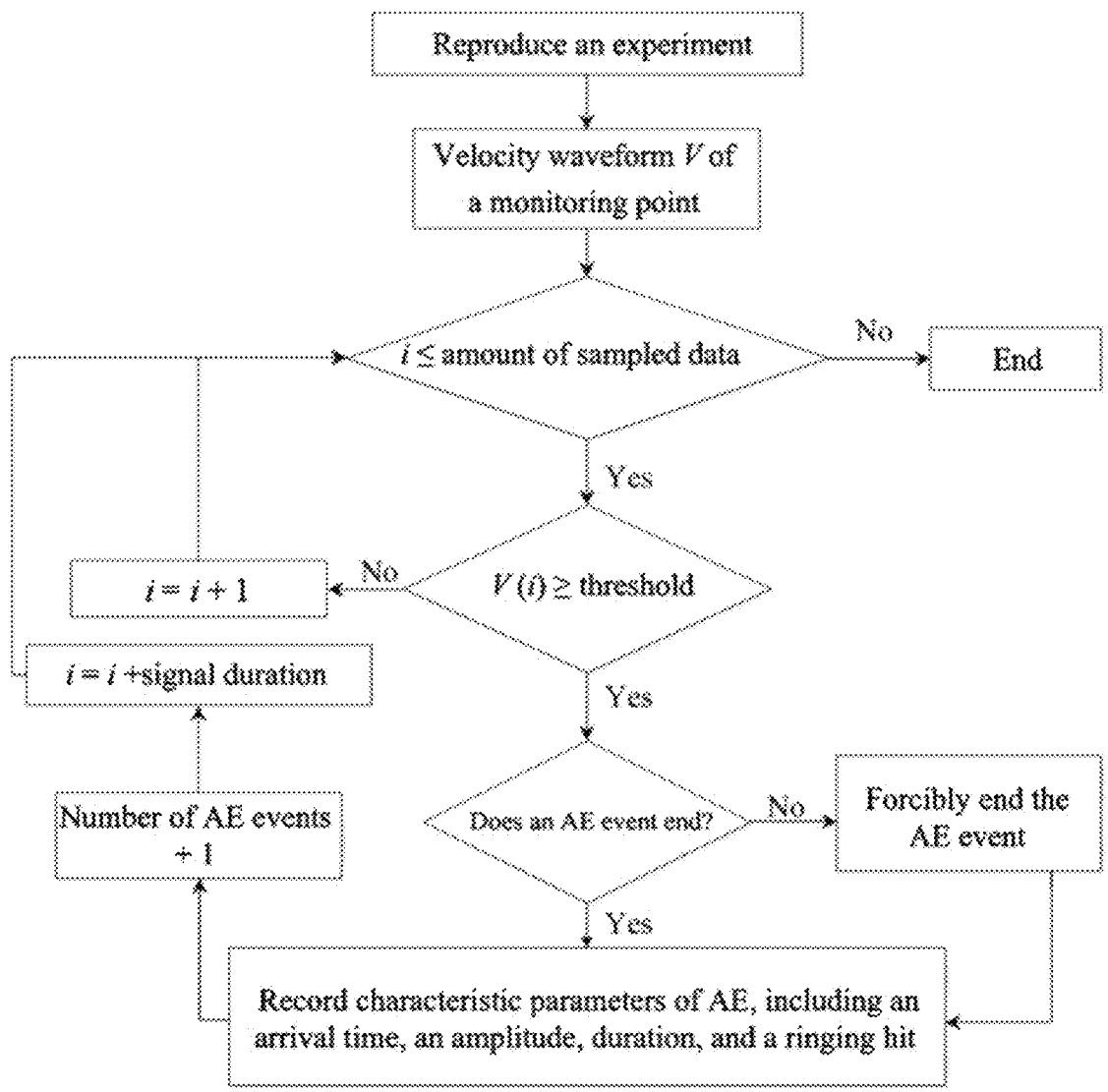
FIG. 2 is a flowchart of a method for obtaining a hit of AE according to an embodiment of the present disclosure.

FIG. 2 shows a specific process, including the following detailed steps:

A1: importing the velocity waveform of the monitoring point;

A2: analyzing each piece of sampled data in sequence;

A3: determining whether the $i^{th}$ piece of data is less than or equal to a total amount of sampled data;

A4: if the $i^{th}$ piece of data is less than or equal to the total amount of sampled data, ending the process; or A5: if the $i^{th}$ piece of data is not less than or equal to the total amount of sampled data, performing a next step;

A6: determining whether the $i^{th}$ piece of data is greater than or equal to the preset threshold;

A7: if the $i^{th}$ piece of data is not greater than or equal to the preset threshold, setting i to i+1, and returning to step A2 to analyze a next piece of data; or A8: if the $i^{th}$ piece of data is greater than or equal to the preset threshold, performing a next step:

A9: determining whether an AE event ends;

A10: if the AE event does not end, forcibly ending the AE event, and performing a next step: or A11: if the AE event ends, recording characteristic parameters of AE, including an arrival time, an amplitude, signal duration, and a ringing hit: and A12: analyzing a next AE signal, till all the sampled data is analyzed.

2) Obtain the energy. In the actual AE experiment, the energy E of AE is counted as the square of the amplitude. The energy of the sampling point can be obtained based on the square of the obtained velocity waveform. The magnitude of the sampling point can be obtained according to an empirical formula $$M(i) = \frac{2}{3}\log E - 3.2.$$

Figure 3:
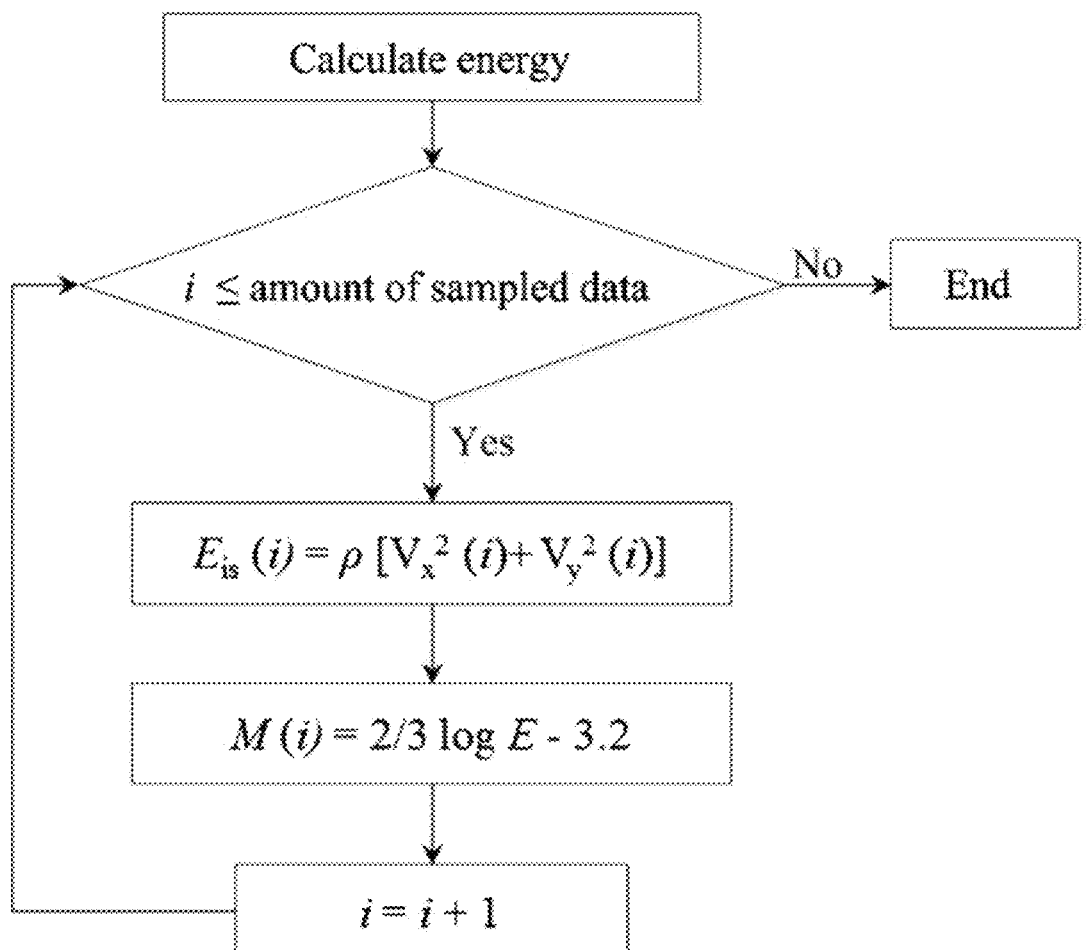
FIG. 3 is a flowchart of a method for obtaining energy of AE according to an embodiment of the present disclosure.

FIG. 3 shows a specific process, including the following detailed steps:

B1: determining whether the $i^{th}$ piece of data is less than or equal to the total amount of sampled data;

B2: if the $i^{th}$ piece of data is not less than or equal to the total amount of sampled data, ending the process; or B3: if the $i^{th}$ piece of data is less than or equal to the total amount of sampled data, calculating $E(i)=[V_x^2(i)+V_y^2(i)]$;

B4: calculating $$M(i) = \frac{2}{3}\log E - 3.2;$$

and

B5: setting i to i+1, and returning to step B1, till all the sampled data is analyzed.

Figure 4:
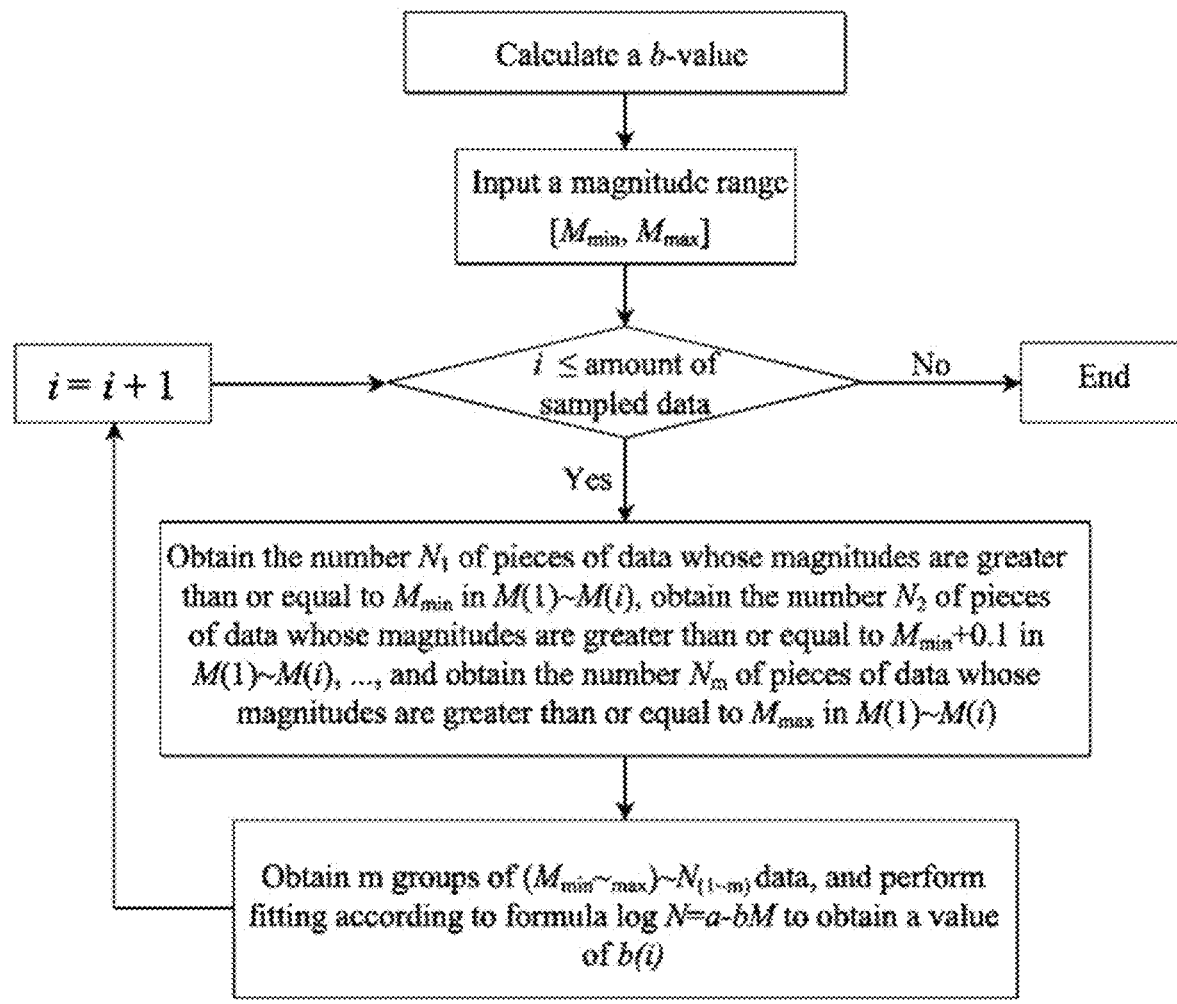
FIG. 4 is a flowchart of a method for obtaining a b-value of AE according to an embodiment of the present disclosure.

3) Obtain the b-value. At first, a proper magnitude range is set to construct a proper magnitude gradient. Then, the number N of pieces of data whose magnitudes are greater than or equal to each magnitude M in sampled data 1~i is determined, and linear fitting is performed according to a formula log N=a−bM, to further obtain a b-value corresponding to the $i^{th}$ piece of sampled data, where a and b are constants. FIG. 4 shows a specific process, including the following detailed steps:

C1: inputting a magnitude range $[M_{min}, M_{max}]$, and setting M to $M_{min}$;

C2: determining whether the $i^{th}$ piece of data is less than or equal to the total amount of sampled data;

C3: if the $i^{th}$ piece of data is not less than or equal to the total amount of sampled data, ending the process; or C4: if the $i^{th}$ piece of data is less than or equal to the total amount of sampled data, performing a next step:

C5: obtaining the number N1 of pieces of data whose magnitudes are greater than or equal to $M_{min}$ in M(1)~M(i), obtaining the number N2 of pieces of data whose magnitudes are greater than or equal to $M_{min+0.1}$ in M(1)~M(i), . . . , and obtaining the number Nm of pieces of data whose magnitudes are greater than or equal to $M_{max}$ in M(1)~M(i), where specifically, for the sampling points 1~i, the magnitude range, for example, [1, 2, 3, 4 . . . ], is first preset; then, the number N(1) of pieces of data whose magnitudes are greater than or equal to 1 is determined, the number N(2) of pieces of data whose magnitudes are greater than or equal to 2 is determined, and so on, to obtain [N(1), N(2), N(3), N(4)] corresponding to the magnitude range [1, 2, 3, 4 . . . ]; and finally, fitting is performed according to the formula to obtain a value of b(i); and C6: obtaining m groups of $(M_{min}\sim_{max})\sim N_{(1-m)}$ data, performing fitting according to the formula log N=a−bM to obtain the value of b(i), setting i to i+1, and returning to step C2.

Embodiment

An AE experiment under uniaxial compression is conducted for a shale to obtain macroscopic mechanical parameter such as uniaxial compression strength and a Young modulus of a rock sample.

Figure 5:
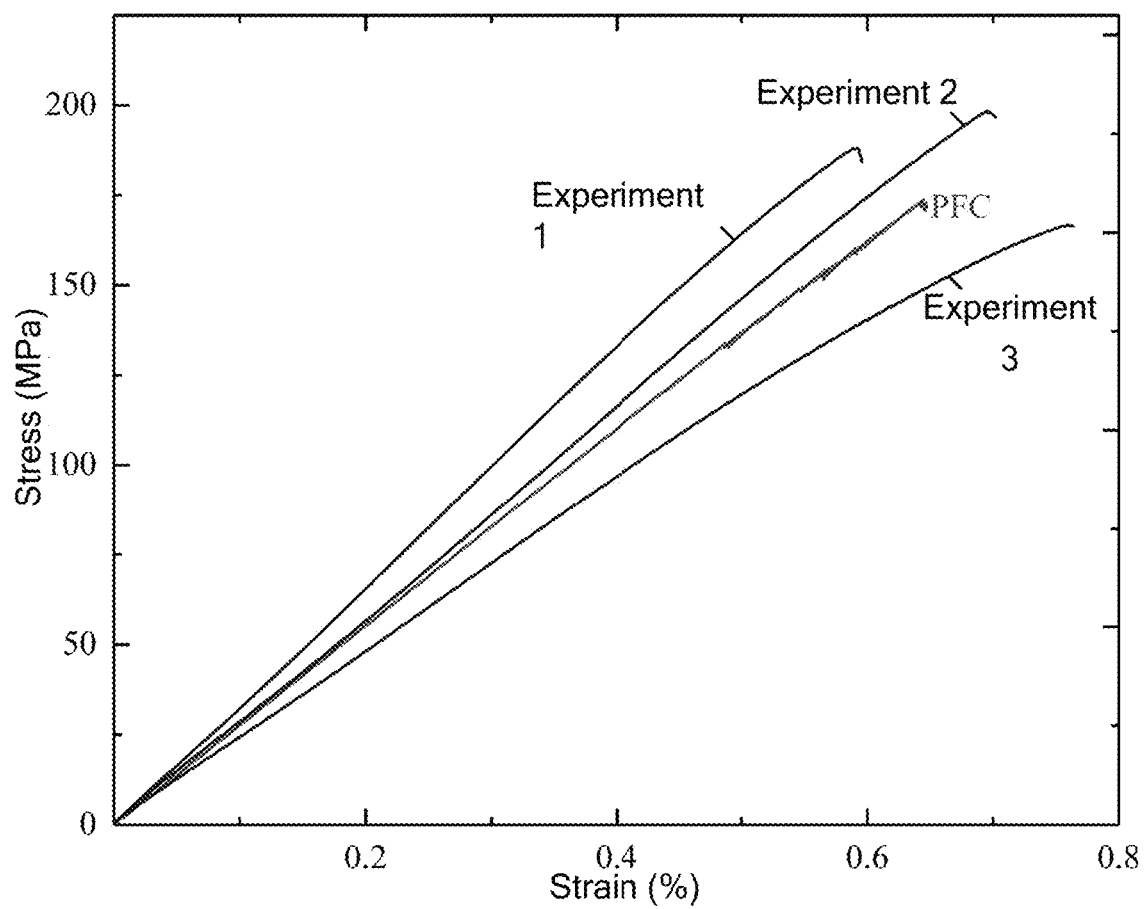
FIG. 5 is a schematic fitting diagram of a stress-strain curve according to an embodiment of the present disclosure.

The experiment is reproduced by using discrete element software PFC. Dimensions of a numerical model are consistent with those of the rock sample. An obtained stress-strain curve is shown in FIG. 5. It can be learned that the established numerical model can better reproduce the experiment.

Figure 6:
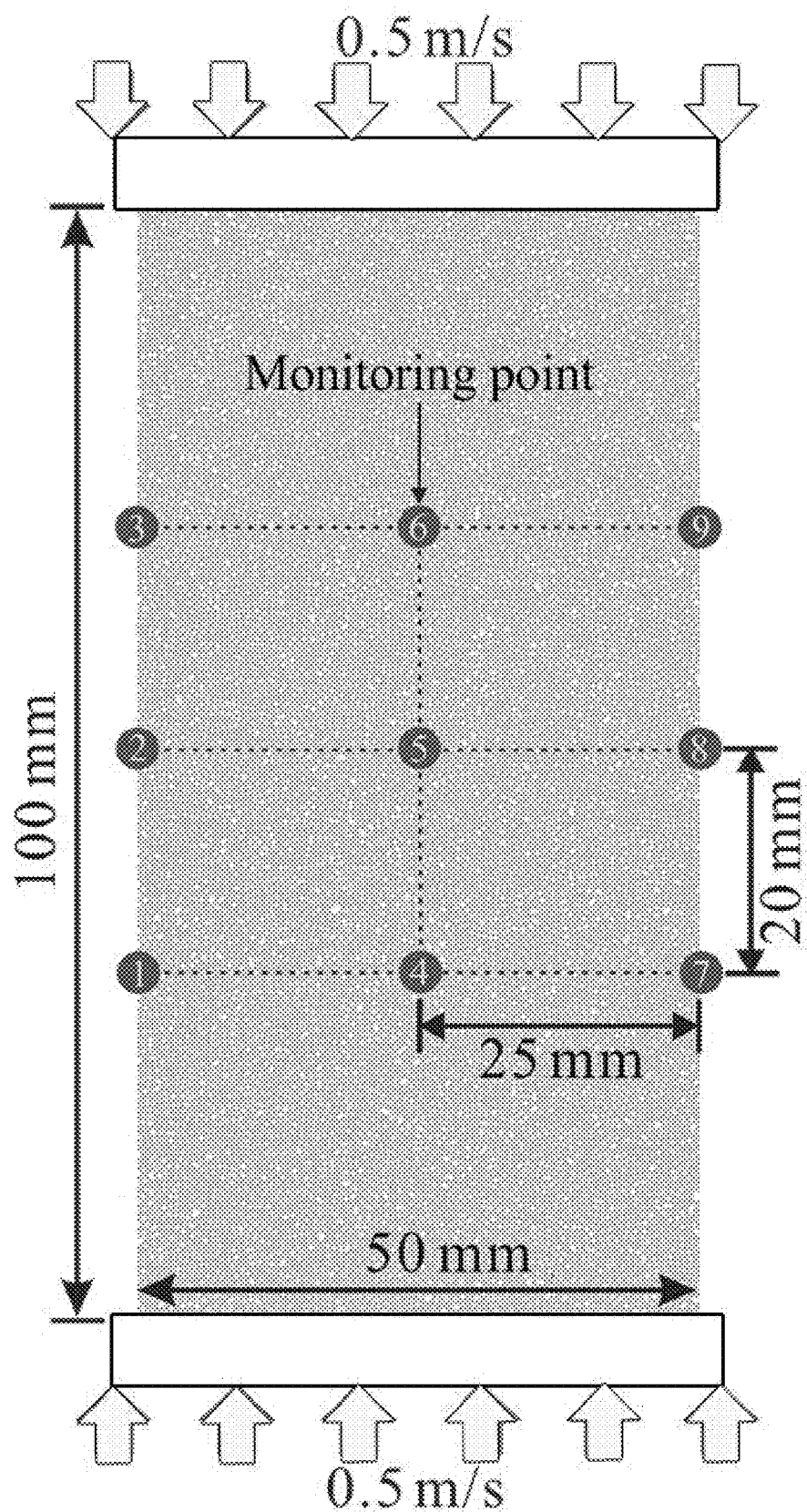
FIG. 6 is a schematic diagram of arranging a monitoring point according to an embodiment of the present disclosure.

Nine monitoring points are evenly arranged on a surface of the numerical model at an axial-direction spacing of 20 mm and a side-direction spacing of 25 mm, and are numbered 1 to 9, as shown in FIG. 6.

Velocity waveforms of the nine monitoring points are monitored.

The velocity waveforms are analyzed to obtain hits, energy, and b-values of AE. The monitoring point 2 is used as an example for comparative analysis.

A traditional moment tensor method is used to simulate AE in a simulation process, to obtain a hit, energy, and a b-value of AE.

Figure 7:
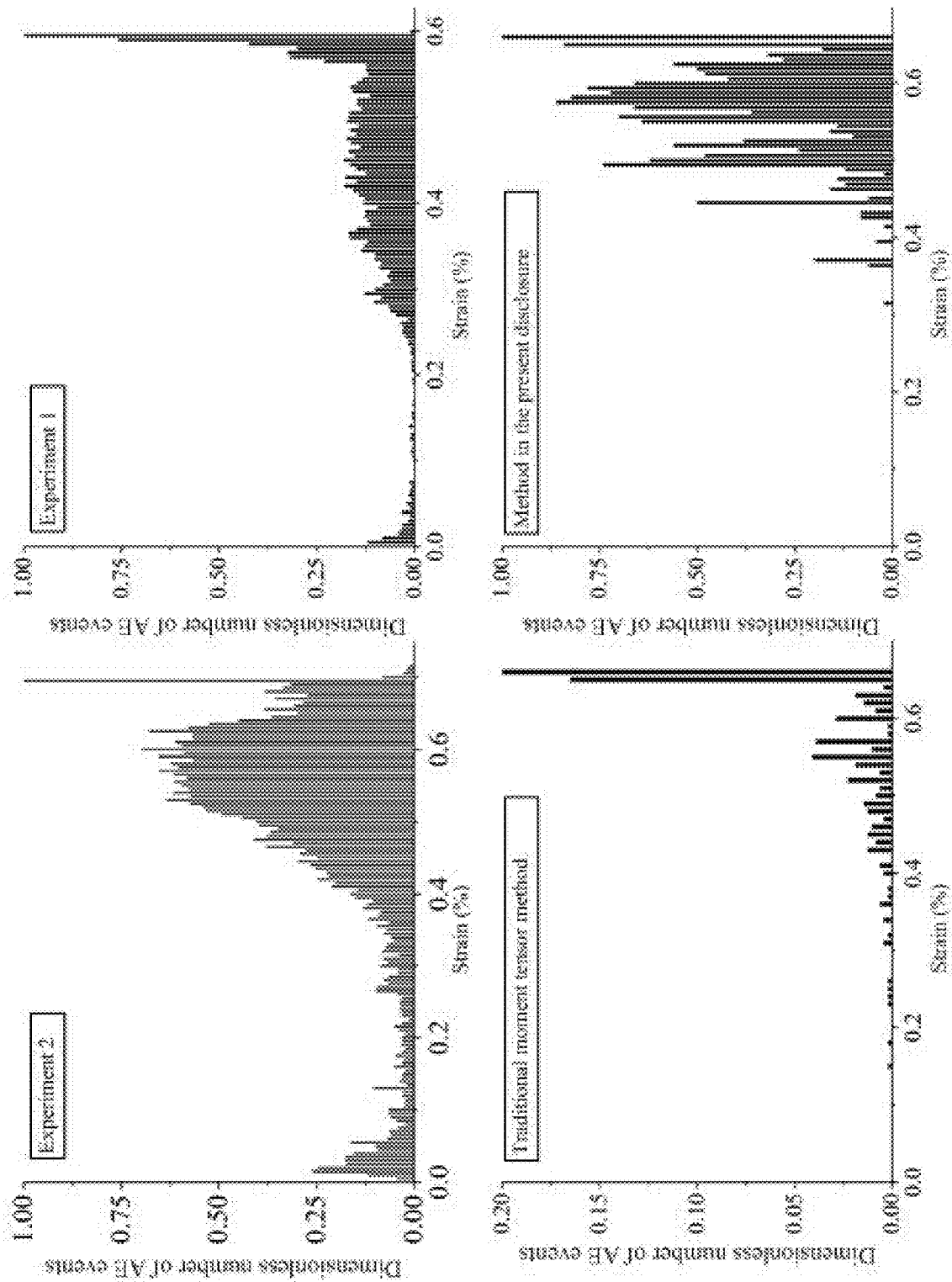
FIG. 7 compares hits of AE according to an embodiment of the present disclosure.
Figure 8:
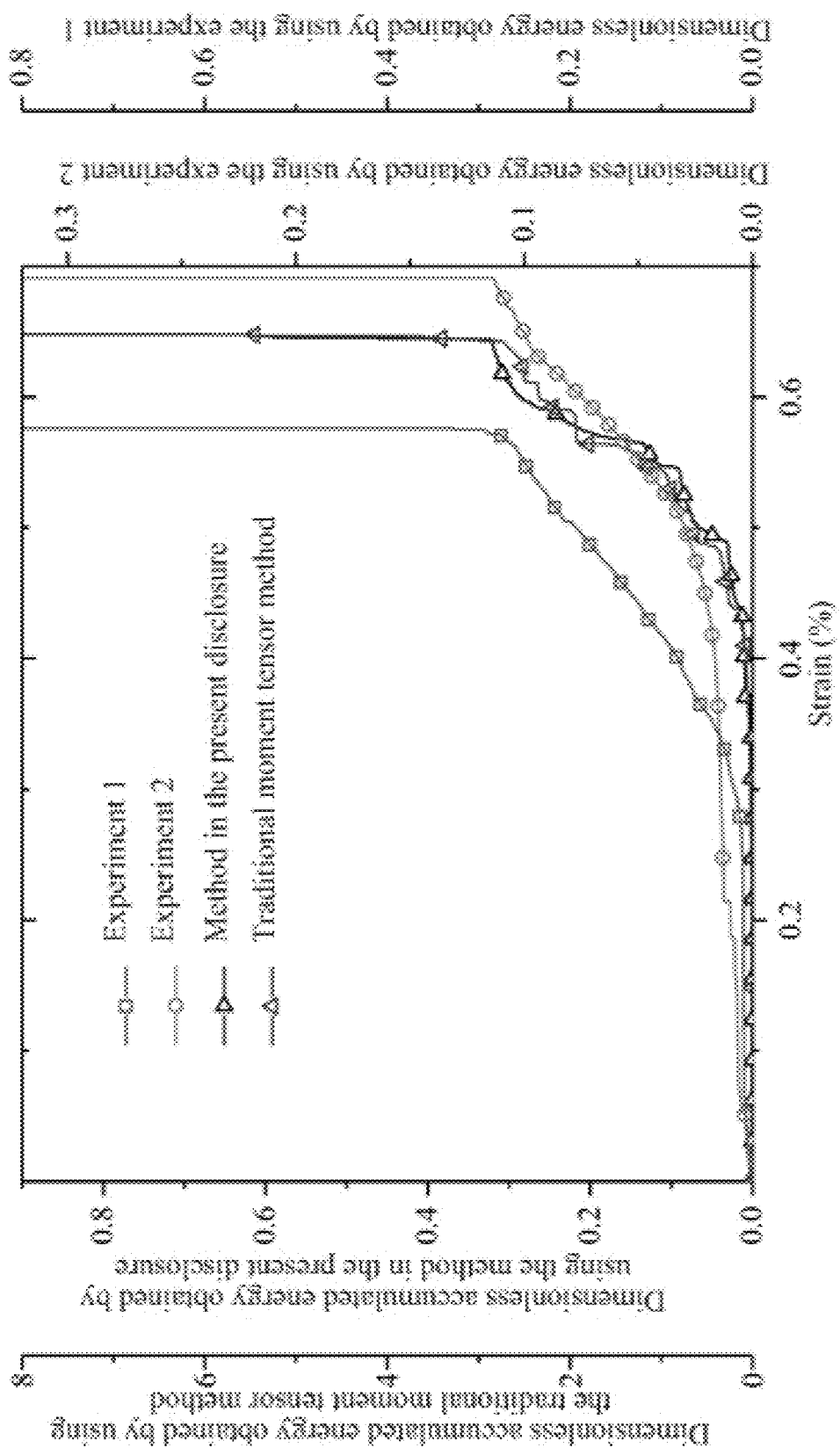
FIG. 8 compares energy of AE according to an embodiment of the present disclosure.
Figure 9:
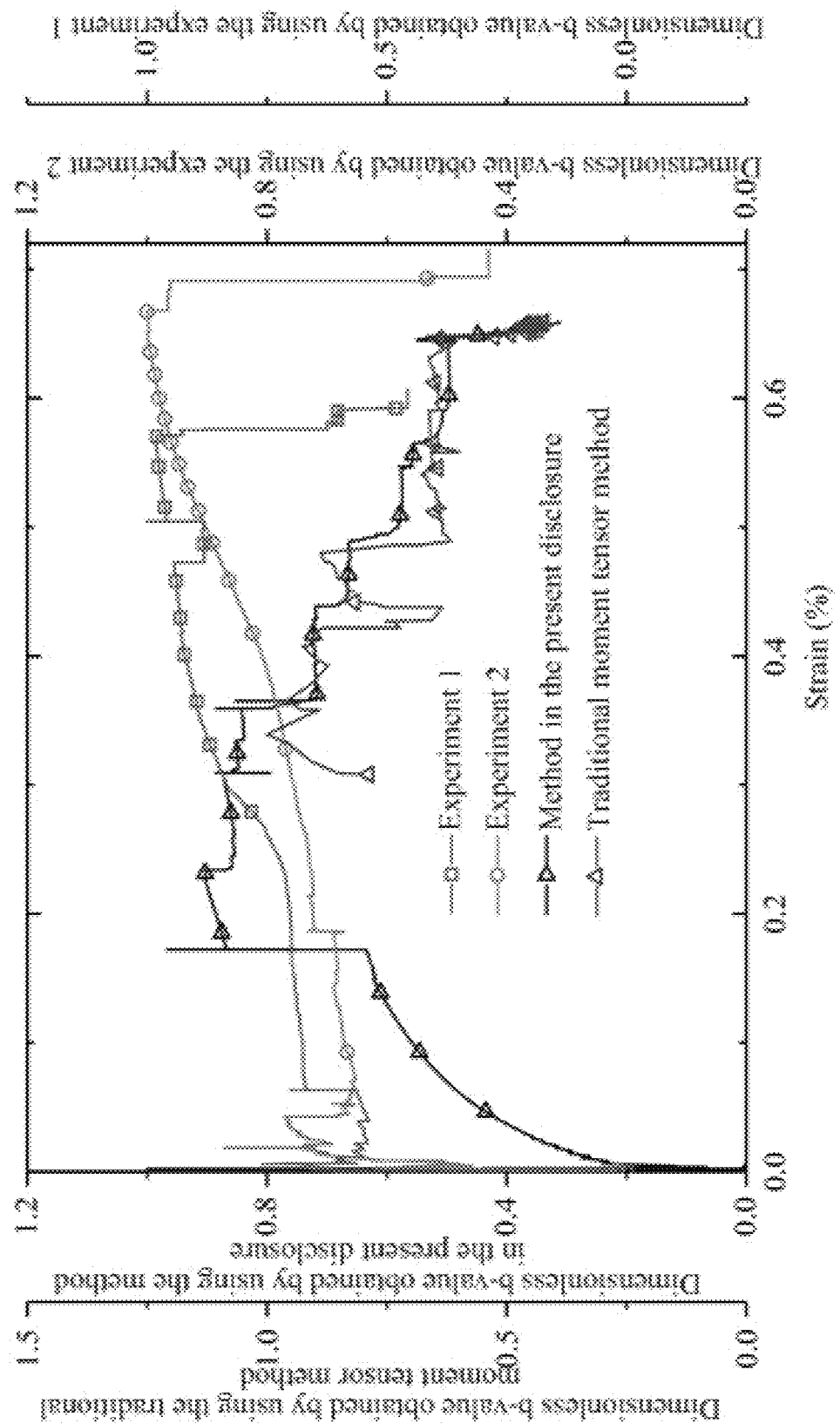
FIG. 9 compares b-values according to an embodiment of the present disclosure.

AE results obtained by using the experiment, the moment tensor method, and the present disclosure are compared, as shown in FIG. 7, FIG. 8, and FIG. 9.

Figure 10:
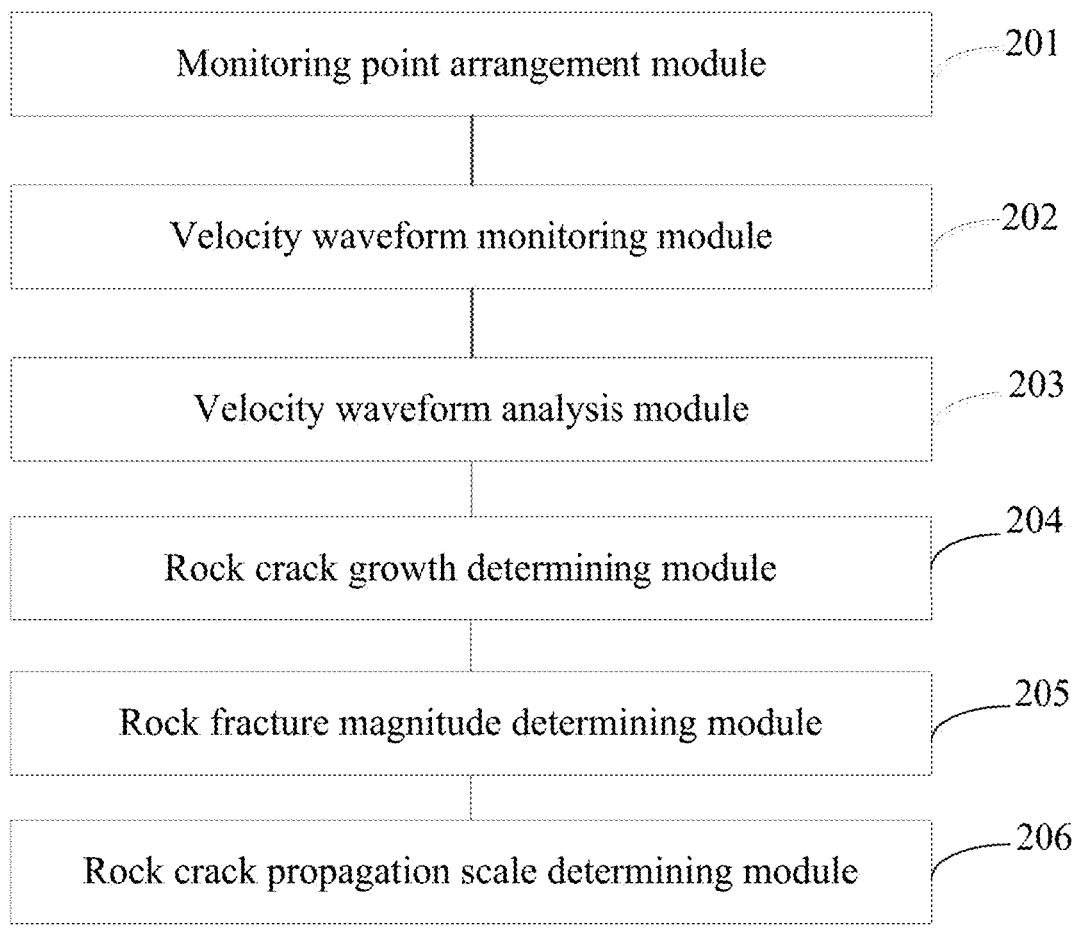
FIG. 10 is a schematic structural diagram of a DEM-based simulation system for AE according to an embodiment of the present disclosure.

FIG. 10 is a schematic structural diagram of a DEM-based simulation system for AE according to an embodiment of the present disclosure. As shown in FIG. 10, the system includes;

a monitoring point arrangement module 201, configured to arrange a monitoring point on a surface of a numerical model:

a velocity waveform monitoring module 202, configured to monitor a velocity waveform of the monitoring point;

a velocity waveform analysis module 203, configured to analyze the velocity waveform to obtain a hit, energy, and a b-value of AE;

a rock crack growth determining module 204, configured to determine rock crack growth based on the hit of AE;

a rock fracture magnitude determining module 205, configured to determine a magnitude of rock fracture based on the energy; and a rock crack propagation scale determining module 206, configured to determine a scale of rock crack propagation based on the b-value.

Each embodiment of this specification is described in a progressive manner, each embodiment focuses on the difference from other embodiments, and the same and similar parts between the embodiments may refer to each other. For the system disclosed in the embodiments, since the system corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A discrete element method (DEM)-based simulation method for acoustic emission (AE), wherein the simulation method comprises:

acquiring parameters of a rock sample;

creating a numerical model based on the acquired parameters of the rock sample such that dimensions of the numerical model are consistent with the rock sample;

arranging a monitoring point on a surface of the numerical model to be consistent with a position of an AE probe in an actual AE experiment;

monitoring a velocity waveform of the monitoring point;

analyzing the velocity waveform to obtain a hit, energy, and a b-value of AE; and determining rock crack growth based on the hit of AE, a magnitude of rock fractures based on the energy, and a scale of rock crack propagation based on the b-value;

wherein the analyzing the velocity waveform to obtain a hit of AE specifically comprises:

A1: importing the velocity waveform of the monitoring point;

A2: analyzing each piece of sampled data in sequence;

A3: determining whether the $i^{th}$ piece of data is less than or equal to a total amount of sampled data;

A4: if the $i^{th}$ piece of data is less than or equal to the total amount of sampled data, ending the process; or A5: if the $i^{th}$ piece of data is not less than or equal to the total amount of sampled data, performing a next step;

A6: determining whether the $i^{th}$ piece of data is greater than or equal to a preset threshold;

A7: if the $i^{th}$ piece of data is not greater than or equal to the preset threshold, setting i to i+1, and returning to step A2 to analyze a next piece of data; or A8: if the $i^{th}$ piece of data is greater than or equal to the preset threshold, performing a next step;

A9: determining whether an AE event ends;

A10: if the AE event does not end, forcibly ending the AE event, and performing a next step; or A11: if the AE event ends, recording characteristic parameters of the AE event, wherein the characteristic parameters comprises an arrival time, an amplitude, signal duration, and a ringing hit; and A12: analyzing a next AE signal, till all the sampled data is analyzed;

the analyzing the velocity waveform to obtain energy specifically comprises:

B1: determining whether the $i^{th}$ piece of data is less than or equal to a total amount of sampled data;

B2: if the $i^{th}$ piece of data is not less than or equal to the total amount of sampled data, ending the process; or B3: if the $i^{th}$ piece of data is less than or equal to the total sampled data, calculating $E(i)=[V_x^2(i)+V_y^2(i)]$, wherein E(i) represents energy of the $i^{th}$ piece of data, $V_x$ represents an x-direction velocity component, and $V_y$ represents a y-direction velocity component;

B4: calculating $$M(i) = \frac{2}{3}\log E(i) - 3.2,$$

wherein $M(i)$ represents a magnitude of the $i^{th}$ piece of data; and

B5: setting i to i+1, and returning to step B1, till all the sampled data is analyzed; and the analyzing the velocity waveform to obtain a b-value specifically comprises:

C1: inputting a magnitude range $[M_{min}, M_{max}]$, and setting M to $M_{min}$;

C2: determining whether the $i^{th}$ piece of data is less than or equal to a total amount of sampled data;

C3: if the $i^{th}$ piece of data is not less than or equal to the total amount of sampled data, ending the process; or C4: if the $i^{th}$ piece of data is less than or equal to the total amount of sampled data, performing a next step;

C5: obtaining the number N1 of pieces of data whose magnitudes are greater than or equal to $M_{min}$ in $M(1)$~$M(i)$, obtaining the number N2 of pieces of data whose magnitudes are greater than or equal to $M_{min+0.1}$ in $M(1)$~$M(i)$, . . . , and obtaining the number Nm of pieces of data whose magnitudes are greater than or equal to $M_{max}$ in $M(1)$~$M(i)$; wherein $M(1)$ represents the magnitude of the first data, and $M(i)$ represents the magnitude of the i-th data; and C6: obtaining m groups of $(M_{min}\text{~}_{max})$~$N_{(1\text{~}m)}$ data, performing fitting according to a formula $\log N = a - bM$ to obtain a value of b(i), setting i to i+1, and returning to step C2, wherein a and b are constants.

2. A discrete element method (DEM)-based simulation system for acoustic emission (AE) comprising a processor and a memory having instructions stored, wherein the processor executes the instructions stored in the memory to perform the following steps:

acquiring parameters of a rock sample;

creating a numerical model based on the acquired parameters of the rock sample such that dimensions of the numerical model are consistent with the rock sample;

arranging a monitoring point on a surface of the numerical model to be consistent with a position of an AE probe in an actual AE experiment;

monitoring a velocity waveform of the monitoring point;

analyzing the velocity waveform to obtain a hit, energy, and a b-value of AE; and determining rock crack growth based on the hit of AE, a magnitude of rock fractures based on the energy, and a scale of rock crack propagation based on the b-value;

wherein analyzing the velocity waveform to obtain the hit of AE specifically comprises:

A1: importing the velocity waveform of the monitoring point;

A2: analyzing each piece of sampled data in sequence;

A3: determining whether the $i^{th}$ piece of data is less than or equal to a total amount of sampled data;

A4: if the $i^{th}$ piece of data is less than or equal to the total amount of sampled data, ending the process; or A5: if the $i^{th}$ piece of data is not less than or equal to the total amount of sampled data, performing a next step;

A6: determining whether the $i^{th}$ piece of data is greater than or equal to a preset threshold;

A7: if the $i^{th}$ piece of data is not greater than or equal to the preset threshold, setting i to i+1, and returning to step A2 to analyze a next piece of data; or A8: if the $i^{th}$ piece of data is greater than or equal to the preset threshold, performing a next step;

A9: determining whether an AE event ends;

A10: if the AE event does not end, forcibly ending the AE event, and performing a next step; or A11: if the AE event ends, recording characteristic parameters of AE, comprising an arrival time, an amplitude, signal duration, and a ringing hit; and A12: analyzing a next AE signal, till all the sampled data is analyzed;

analyzing the velocity waveform to obtain the energy specifically comprises:

B1: determining whether the $i^{th}$ piece of data is less than or equal to a total amount of sampled data;

B2: if the $i^{th}$ piece of data is not less than or equal to the total amount of sampled data, ending the process; or B3: if the $i^{th}$ piece of data is less than or equal to the total amount of sampled data, calculating $E(i) = [V_x^2(i) + V_y^2(i)]$;

B4: calculating $$M(i) = \frac{2}{3}\log E - 3.2;$$

and

B5: setting i to i+1, and returning to step B1, till all the sampled data is analyzed; and analyzing the velocity waveform to obtain the b-value specifically comprises:

C1: inputting a magnitude range $[M_{min}, M_{max}]$, and setting M to $M_{min}$;

C2: determining whether the $i^{th}$ piece of data is less than or equal to a total amount of sampled data;

C3: if the $i^{th}$ piece of data is not less than or equal to the total amount of sampled data, ending the process; or C4: if the $i^{th}$ piece of data is less than or equal to the total amount of sampled data, performing a next step;

C5: obtaining the number N1 of pieces of data whose magnitudes are greater than or equal to $M_{min}$ in $M(1)$~$M(i)$, obtaining the number N2 of pieces of data whose magnitudes are greater than or equal to $M_{min+0.1}$ in $M(1)$~$M(i)$, . . . , and obtaining the number Nm of pieces of data whose magnitudes are greater than or equal to $M_{max}$ in $M(1)$~$M(i)$; wherein $M(1)$ represents the magnitude of the first data, and $M(i)$ represents the magnitude of the i-th data; and C6: obtaining m groups of $(M_{min}\text{~}_{max})$~$N_{(1\text{~}m)}$ data, performing fitting according to a formula $\log N = a - bM$ to obtain a value of b(i), setting i to i+1, and returning to step C2, wherein a and b are constants.

* * * * *